(12) United States Patent
Van Aerle et al.

(10) Patent No.: US 6,330,100 B2
(45) Date of Patent: Dec. 11, 2001

(54) DISPLAY DEVICE WITH TRANSFLECTIVE ELECTRODE

(75) Inventors: Nicolaas A. J. M. Van Aerle; Michael G. Pitt, both of Eindhoven (NL)

(73) Assignee: U. .S Philips Corporation, New York, NY (US)

( * ) Notice: Subject to any disclaimer, the term of this patent is extended or adjusted under 35 U.S.C. 154(b) by 0 days.

(21) Appl. No.: 09/778,059

(22) Filed: Feb. 6, 2001

Related U.S. Application Data

(63) Continuation of application No. 09/204,177, filed on Dec. 3, 1998, now Pat. No. 6,211,992.

(30) Foreign Application Priority Data

Dec. 4, 1997 (EP) .................................................. 97203799

(51) Int. Cl.$^7$ ................................ G02F 1/07; G02F 1/29; G02F 1/133
(52) U.S. Cl. ........................ 359/254; 354/267; 354/257; 354/320; 349/21

(58) Field of Search ..................... 349/21, 143; 359/254, 359/251, 263, 267, 256, 257, 258, 315, 318, 320

(56) References Cited

U.S. PATENT DOCUMENTS 4,420,896 * 12/1983 Castleberry ............................ 40/427
5,753,937 * 5/1998 Shimomaki et al. .................. 257/59

* cited by examiner

*Primary Examiner*—Georgia Epps
*Assistant Examiner*—Tim Thompson
(74) *Attorney, Agent, or Firm*—Aaron Waxler

(57) ABSTRACT

A transflective color display having apertures in reflective electrodes through which light from a backlight (9) passes in the transmissive mode. The switching behavior for both the reflective and the transmissive mode is made identical by introducing a retardation plate (11). The transmission efficiency is further increased by using only a monochrome green mode in transmission.

13 Claims, 4 Drawing Sheets

US 6,330,100 B2

DISPLAY DEVICE WITH TRANSFLECTIVE ELECTRODE

CROSS REFERENCE TO RELATED APPLICATIONS

This is a continuation of application Ser. No. 09/204,177, filed Dec. 3, 1998 now U.S. Pat. No. 6,211,992.

BACKGROUND OF THE INVENTION

The invention relates to a display device comprising a display panel with a first light-transmitting substrate provided with reflective material, a second light-transmitting substrate and an electro-optical material between said two substrates.

Such display devices are used, for example, in (portable) display screens in hand-held telephones, organizers but also, for example, in automotive applications.

A (transflective) display device of the type mentioned in the opening paragraph is described in IBM TDB Vol. 15, No. 8, pp. 2435–6. In the reflective state, ambient light is reflected by the reflective material, in this case a reflective electrode (a partly covered mirror) of, for example, chromium or aluminium. In the transmissive state, these electrodes pass light, and in the reflective state they reflect incident light. The actual picture elements (characters) are provided on the electrodes by means of etching.

To ensure that sufficient light can be passed in the transmissive state, the mirror must not be thick (in the case of aluminium, for example, thinner than 15 mm). It is very difficult to provide such mirrors with sufficient accuracy. Variations in thickness cause large variations in light transmission and, as a result, lead to non-uniform behavior in both the reflective state and the transmissive state. In the case of relatively large panels, the small thickness additionally influences the drive behavior because the square resistance becomes too high.

Another problem arises if birefringent material, for example twisted nematic (liquid-crystal) material is used in such a display device, because said material causes the transmission-voltage curve to be different in the transmissive mode and in the reflective mode.

SUMMARY OF THE INVENTION

The present invention aims, inter alia, at obviating one or more of the above-mentioned drawbacks.

To achieve this, a display device in accordance with the invention is characterized in that at the location of picture elements the reflective material is provided with at least one aperture.

By providing the layer of reflective material with (an) aperture(s) (occupying for example up to 30% of the surface area), sufficient light from a light source (backlight) is passed, while, on the other hand, the layer of reflective material (for example of aluminium) has such a thickness now (for example approximately 250 nm) that thickness variations of a few nanometers caused by process variations do not influence the uniformity of the display panel. Also the square resistance decreases considerably.

The above-mentioned apertures can be provided in individual picture electrodes in accordance with a pattern. In another embodiment, the aperture defines the individual picture elements.

A preferred embodiment of a display device in accordance with the invention is characterized in that the electro-optical material is switchable between two states having a different birefringence, the display panel is provided with polarizers and with a retardation foil between the first substrate and a first (back)polarizer. Particularly in the case of panels based on (super)twisted nematic effect (S)TN, the voltage dependence for the transmissive mode differs substantially from that for the reflective mode. For use in the reflective mode, a display panel is generally embodied so that, after passing a front polarizer, light of a(n) (average) wavelength $\lambda$ is subject to a change in polarization in the liquid crystal material, such that, dependent upon the voltage, elliptically to circularly polarized light impinges on the reflecting electrode (retardation $1/4\lambda$). Dependent upon the drive voltage, after reflection a smaller or larger degree of extinction occurs at the location of the front polarizer. By providing a retardation filter between the first substrate and the first (back)polarizer, said apertures (in the transmissive mode) pass light at the location of the reflector, which light is elliptically polarized and, in particular, circularly polarized. As a result, the black-state is optimally corrected. Consequently, the voltage-dependence of the transmissive mode is practically identical to that of the reflective mode, so that the use of a single voltage region is sufficient, thus saving costs.

Depending on the circumstances, it may be sufficient to use a green light-emitting light source as the backlight. Generally, the transmissive mode is used during less than 5% of the above-mentioned applications, so that it is hardly disturbing that in the transmissive mode not the entire color palette is used. This means that very efficient green backlights can be employed.

Preferably, the apertures are situated at the location of green picture elements. The wavelength of the light source is preferably adapted to the transmission peak of the green part of a color filter present in the display cell.

These and other aspects of the invention will be apparent from and elucidated with reference to the embodiments described hereinafter.

BRIEF DESCRIPTION OF THE DRAWING

In the drawings.

The Figures are diagrammatic and not drawn to scale. In general, like reference numerals refer to like parts.

DETAILED DESCRIPTION OF THE PRIMARY EMBODIMENT

Figure 1:
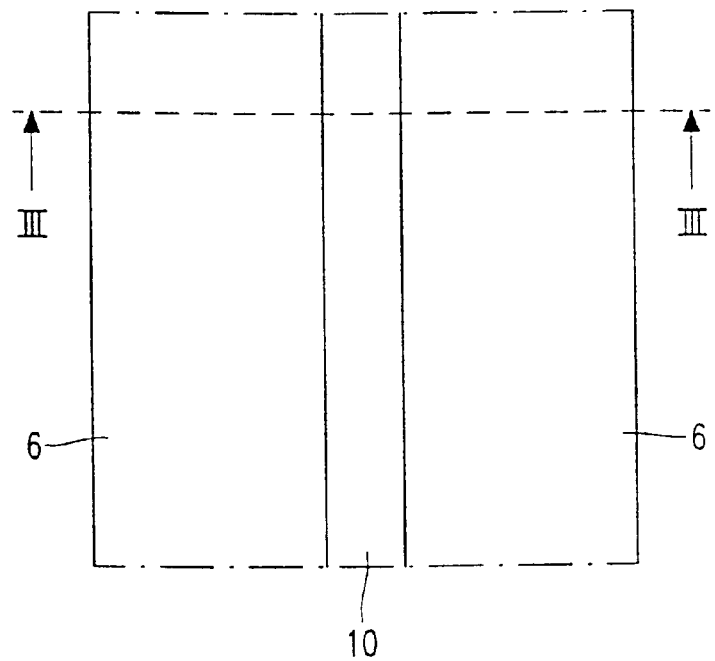
FIG. 1 is a plan view of a part of a display device in accordance with the invention.
Figure 2:
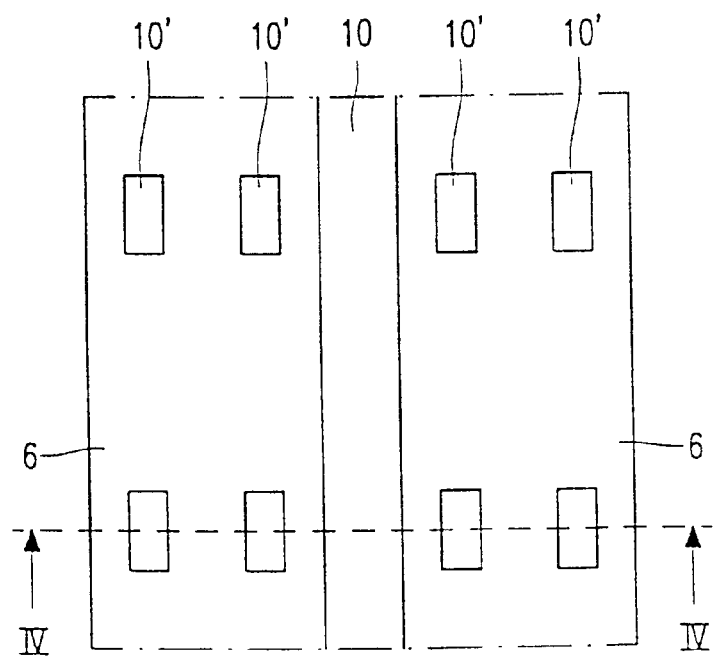
FIG. 2 is a variant of FIG. 1.
Figure 3:
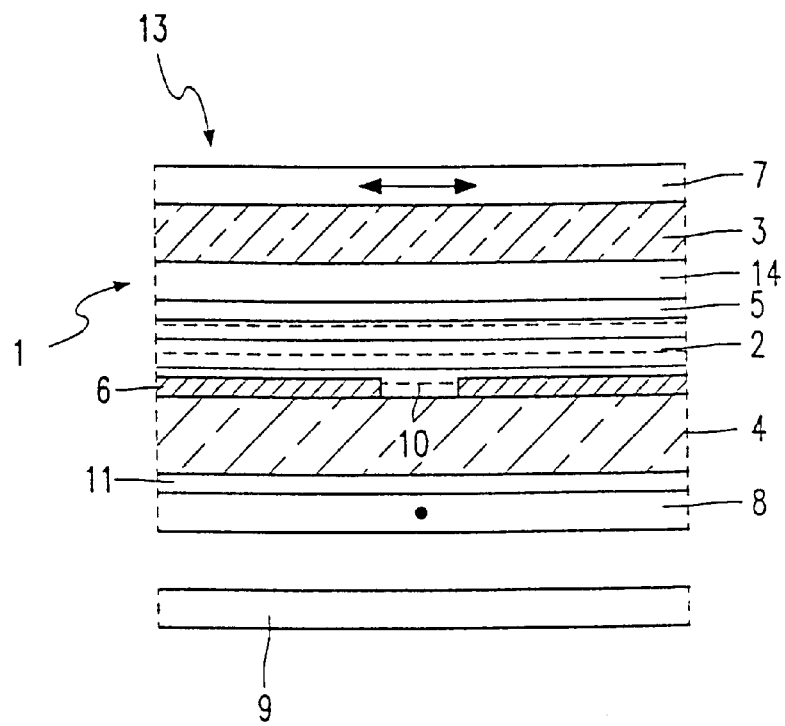
FIG. 3 is a cross-sectional view taken on the line III—III in FIG. 1.
Figure 4:
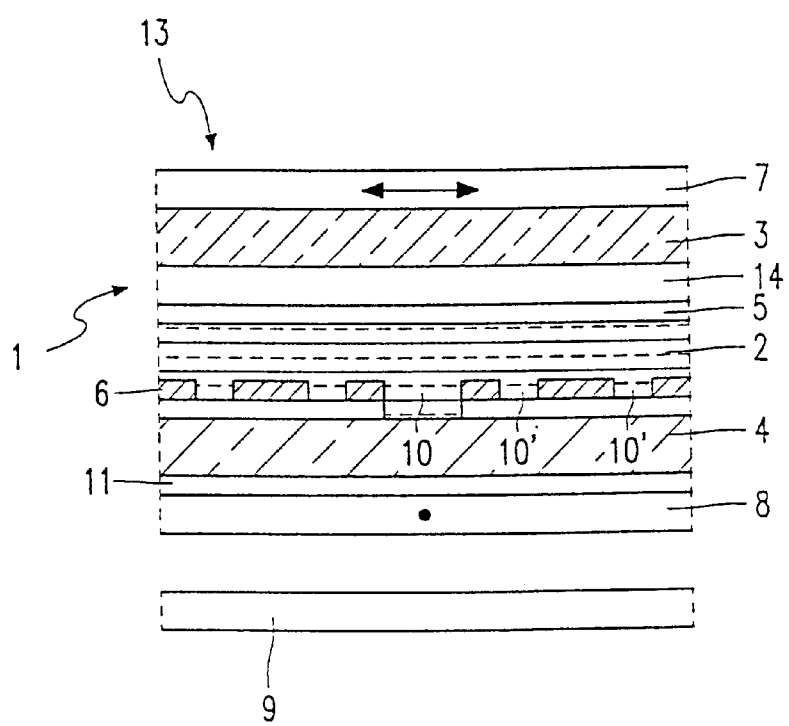
FIG. 4 is a cross-sectional view taken on the line IV—IV in FIG. 2.

FIG. 1 and FIG. 2 are schematic plan views, and FIG. 3 and FIG. 4 are cross-sectional views of a part of a display device comprising an electro-optical display cell, in this example a liquid crystal cell 1 with a twisted nematic liquid-crystal material 2 which is sandwiched between two transparent substrates 3, 4 of, for example, glass, provided with electrodes 5, 6. The electrode 5 is made of a light-transmitting material, while the electrode 6 is made of a reflective or diffusely reflective material, such as aluminium or silver. The thickness of the reflective material is chosen to be such (150–400 nm) that no light is passed. To allow light originating from an illumination source (backlight) (9) to pass nevertheless in the transmissive state, the reflective electrode material is provided with at least one aperture. For example, the electrodes 6 are surrounded by apertures 10 (FIGS. 1, 3) or provided with apertures 10' (FIGS. 2, 4) which occupy, for example, maximally 25% of the electrode surface. During operation in the reflective mode, incident light is now fully reflected by the electrodes 6 and absorbed at the location of apertures 10, 10', which leads to an increase of the contrast, while during operation of the illumination source 9, the apertures 10, 10' allow sufficient light to pass. As shown in FIG. 4, the electrodes 6 may be provided, if necessary, on transparent (ITO) electrodes 12.

Figure 5:
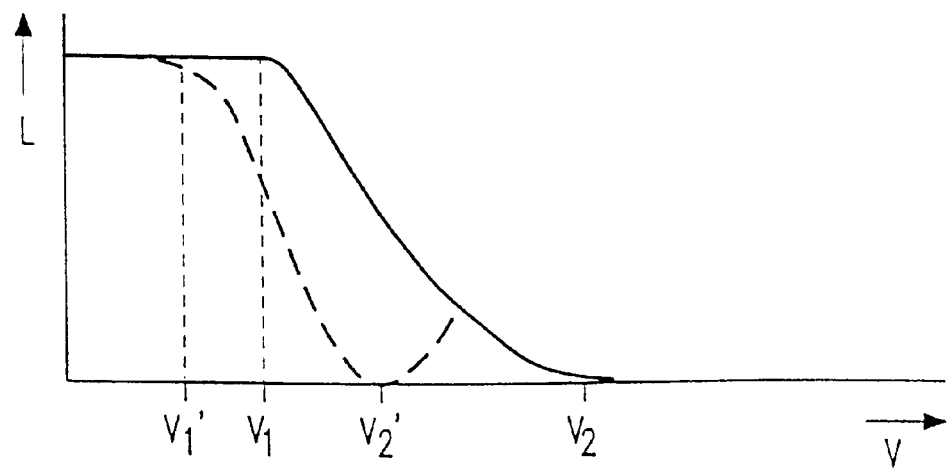
FIG. 5 shows the variation of the transmission and reflection as a function of the voltage for various types of devices.

Different electro-optical effects may be applied, in particular liquid crystal effects, such as (S)TN, guest-host, PDLC, ECB, ferro-electrics etc. In this example, the device comprises two polarizers 7, 8 whose directions of polarization are mutually perpendicular in this example. The device further includes orientation layers (not shown) which orient the nematic liquid crystal material at the inner walls of the substrates, in this example, in such a way that the liquid crystal layer has a twist angle of approximately 60 degrees. In this case, the liquid crystal material has a positive optical anisotropy and a positive dielectric anisotropy. Consequently, if the electrodes 5, 6 are energized by an electric voltage, the molecules and hence the directors orient themselves towards the field. In FIG. 5, the curve indicated by dashed lines shows the reflection-voltage characteristic of such a device. Incident light 13 is transformed at a voltage $V_2'$ to elliptically (preferably circularly) polarized light which is reflected at the location of the reflecting electrode 6 and reaches the polarizer 7 as practically linearly (at right angles to the direction of polarization of the polarizer 7) polarized light and is absorbed (complete extinction). At a decreasing voltage across the liquid crystal cell, the birefringence increases until, at a voltage $V_1'$, the retardation of the liquid crystal layer is such that practically maximum reflection occurs. When the display cell is used in the transmissive mode, the transmission-voltage characteristic corresponds approximately to the continuous line in FIG. 5, if no special measures are taken.

In accordance with a further aspect of the invention, in this example, a retardation foil 11 is situated between the polarizer 8 and the liquid crystalline material 2, which retardation foil converts linearly polarized light passed by the polarizer 8 into elliptically polarized light, preferably, of the same elipticity as the light which, in the reflective mode, is incident on the reflective electrode 6 at a voltage $V_2'$. In the present example, in which the polarizers cross each other at right angles, a 1/4λ plate is used as the retardation foil 11, so that the light originating from the source 9 reaches the liquid crystal layer as circularly polarized light and the switching behavior (transmission-voltage curve) becomes practically identical to the dashed line shown in FIG. 5. In particular, $V_2$ becomes practically equal to $V_2'$, so that the curves in the region near complete extinction coincide.

To reproduce color images, the device of FIGS. 3, 4 is provided with a color filter 14. As mentioned in the opening paragraph, the transmissive mode is generally used during less than 5% of the life time. A white light source (backlight) 9, which emits all colors of the spectrum is generally less efficient (in lumens per watt) in the green portion of the spectrum where the eye is most sensitive. The color filter 14 absorbs light in a large portion of the spectrum, so that absorption of light from a white light source (backlight) increases further. For this reason, a green light source, for example an electroluminescent source or an LED, is often used in specific applications (particularly telephones, organizers) where the light source 9 is used comparatively rarely. In this case, the wavelength of the source 9 is adapted, for example, to the transmission peak of the green (part of the) color filter. If necessary, the green picture elements may also be embodied, so as to be larger (1.3–2 times) than the red or blue picture elements to further increase the transmission. If necessary, the green picture elements are embodied so as to form separate rows of picture elements between rows comprising both red and blue picture elements.

In the Table below, the light output in the transmissive mode is compared for 6,5" reflective display panels with 640 (×3)×240 picture elements, having respectively, a green and a white light source.

|  | green | white |
|---|---|---|
| backlight efficiency (lm/W) | 6 | 4 |
| light output at 100 mW (cd/m$^2$) | 23.6 | 15.7 |
| Colour filter transmission (%) | 95% | 50% |
| light output display (cd/m$^2$) | 1.62 | 0.56 |
| Power at 2 cd/m$^2$ (W) | 124 mW | 357 mW |

In both cases, the apertures 10 occupy approximately 20% of the overall surface area. As shown in the Table, the use of a green light source leads, under equal conditions, to a higher light output in the transmissive mode. Therefore, in applications in which the transmissive function is less important, it is more favorable to choose a green light source.

Figure 6:
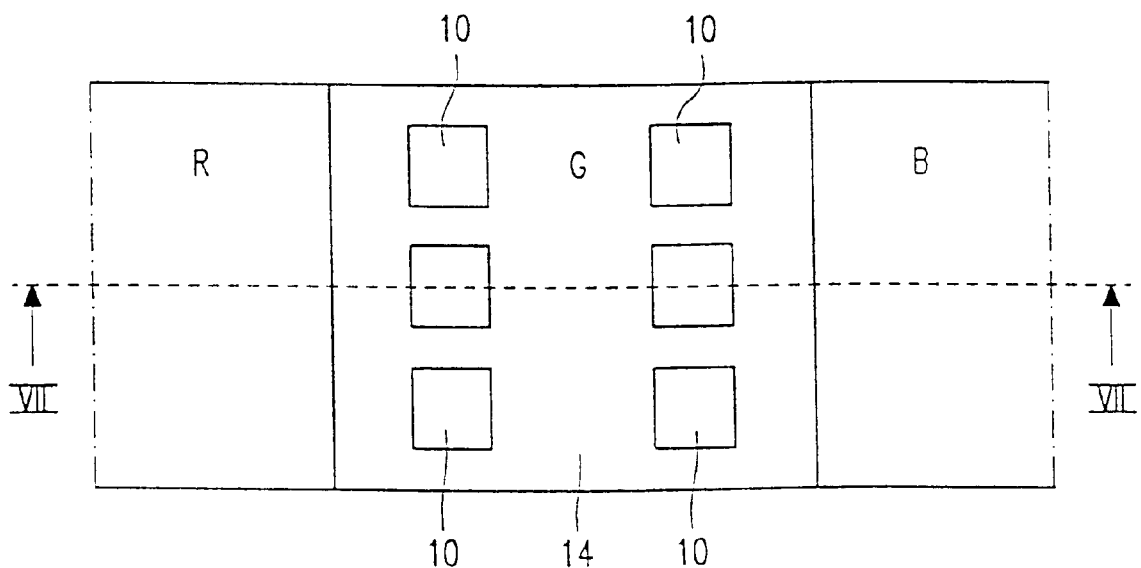
FIG. 6 is a plan view of a part of another display device in accordance with the invention.

FIG. 6 is a plan view of a part of a display cell with a green picture element whose surface area is 1.4 times the surface area of a blue or red picture element (whose surface areas are identical). Since, as mentioned above, the wavelength of the light source 9 is adapted to the transmission peak of the green portion of the color filter, the apertures in the reflective (metal) layer 15 are situated only at the location of the green picture element. The overall surface area of the apertures 10 is approximately 28.5% of the overall surface area of the green picture element, so that for each of the three types of picture elements (red, green, blue) the reflective surface area is the same.

Figure 7:
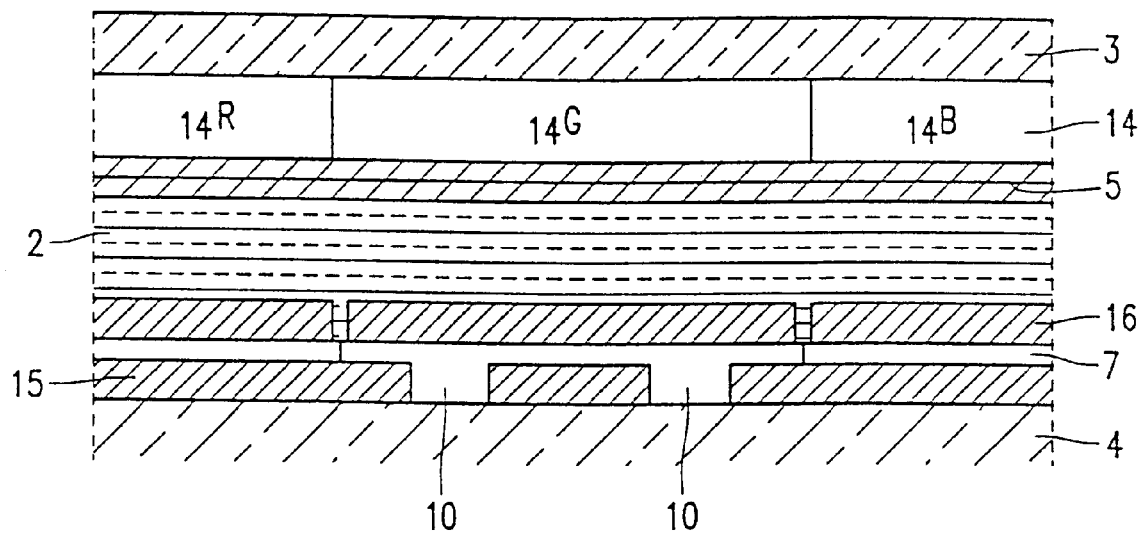
FIG. 7 is a cross-sectional view taken on the line VII—VII in FIG. 6.
Figure 8:
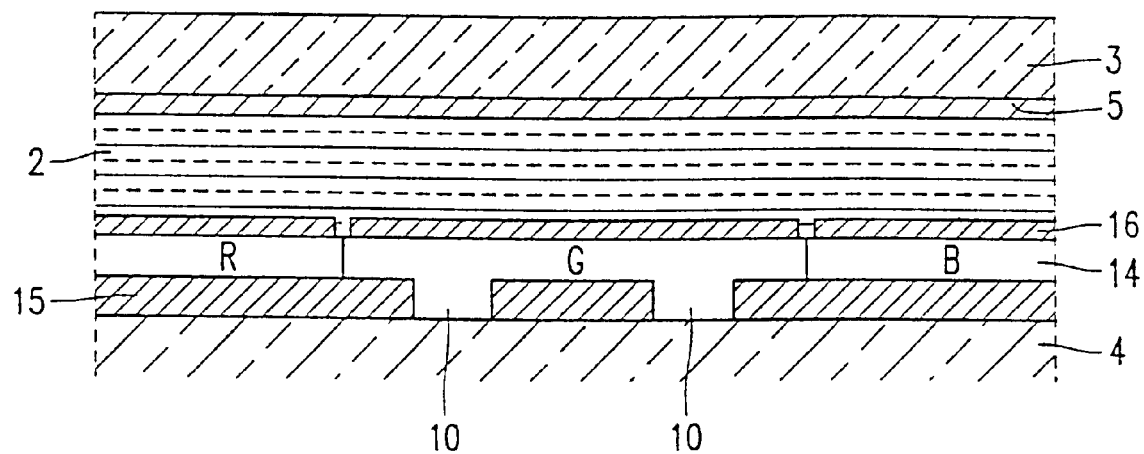
FIG. 8 is a variant of FIG. 7.

In this example, the reflector is embodied so as to be a separate metal layer 15 on which the (now light-transmitting) ITO picture electrode 16 is provided. A passivation layer 17 is situated between the metal layer 15 and the picture electrode 16. The other reference numerals have the same meaning as in the previous examples. FIG. 8 shows a variant in which the color filter 14 is adjacent to the metal layer 15. The other elements, such as polarizers, the backlight, a retardation foil, if any, etc., are not shown in FIGS. 7, 8.

What is claimed is:

1. A display device comprising a display panel with a first light-transmitting substrate provided with reflective material, said reflective material forming part of a picture electrode, a second light-transmitting substrate and an electro-optical material between said two substrates, characterized in that at the location of at least one picture element in said picture electrode the reflective material is provided with at least one aperture.

2. A display device as claimed in claim 1, characterized in that the electro-optical material is switchable between two states having a different birefringence, the display panel is provided with polarizers and with a retardation foil between the first substrate and a first polarizer.

3. A display device as claimed in claim 2, characterized in that the retardation foil comprises a 1/4λ plate, and light incident from the side of the second substrate, in one of the two states, reaches the reflective electrode material as circularly polarized light.

4. A display device as claimed in claim 1. characterized in that the display device is provided, on the side of the first substrate, with a light source emitting green light.

5. A display device as claimed in claim 1, wherein the electro-optical material is switchable between two states having a different birefringence, the display panel is provided with polarizers and with a retardation foil between the first substrate and a first polarizer.

6. A display device comprising a display panel with a first light-transmitting substrate provided with a plurality of picture electrodes arranged according to a pattern, a second light-transmitting substrate and an electro-optical material between said two substrates, characterized in that said picture electrodes comprise a reflective material, at the location of respective picture elements in said picture electrodes the reflective material is provided with at least one respective aperture.

7. A display device as claimed in claim 6, wherein the electro-optical material is switchable between two states having a different birefringence, the display panel I provided with polarizers and with a retardation foil between the first substrate and a first polarizer.

8. A display device as claimed in claim 7, wherein the retardation foil comprises a 1/4λ plate, and light incident from the side of the second substrate, in one of the two states, reaches the reflective electrode material as circularly polarized light.

9. A display device as claimed in claim 6, wherein the display device is provided, on the side of the first substrate, with a light source emitting green light, and said respective apertures are situated at the location of green picture elements.

10. A display device comprising a display panel with a first light-transmitting substrate provided with a picture electrode comprising reflective material, a second light-transmitting substrate and an electro-optical material between said two substrates, wherein at the location of respective picture elements in said picture electrode the reflective material is provided with a respective aperture defining the respective picture element.

11. A display device as claimed in claim 10, wherein the electro-optical material is switchable between two states having a different birefringence, the display panel is provided with polarizers and with a retardation foil between the first substrate and a first polarizer.

12. A display device as claimed in claim 11, wherein the retardation foil comprises a 1/4λ plate, and light incident from the side of the second substrate, in one of the two states, reaches the reflective electrode material as circularly polarized light.

13. A display device as claimed in claim 10, wherein the display device is provided, on the side of the first substrate, with a light source emitting green light, and said respective apertures are situated at the location of green picture elements.

* * * * *